US011511698B1

(12) United States Patent
Ibarra et al.

(10) Patent No.: US 11,511,698 B1
(45) Date of Patent: Nov. 29, 2022

(54) EMBLEMED AIRBAG COVER TEAR SEAMS

(71) Applicant: Autoliv ASP, Inc., Ogden, UT (US)

(72) Inventors: Jason Mark Ibarra, Bloomfield Hills, MI (US); Mark S. Hatfield, Providence, UT (US); Quin Soderquist, South Weber, UT (US); Ken Pijaszek, Grand Blanc, MI (US); Jennifer Marie Johnson, West Bloomfield, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 17/341,097

(22) Filed: Jun. 7, 2021

(51) Int. Cl.
*B60R 21/215* (2011.01)
*B60R 21/2165* (2011.01)

(52) U.S. Cl.
CPC .... *B60R 21/21656* (2013.01); *B60R 21/2165* (2013.01); *B60R 2021/21543* (2013.01)

(58) Field of Classification Search
CPC .............. B60R 21/215; B60R 21/2165; B60R 2021/21543
See application file for complete search history.

(56) References Cited

U.S. PATENT DOCUMENTS

| | | | | |
|---|---|---|---|---|
| 6,588,794 | B1* | 7/2003 | Derrick | B60R 21/2165 280/732 |
| 8,267,422 | B2* | 9/2012 | Sauer | B60R 21/2035 280/731 |
| 10,000,175 | B2* | 6/2018 | Coon | B60R 21/2165 |
| 2003/0209889 | A1* | 11/2003 | Erwin | B60R 21/21656 280/728.3 |
| 2004/0174002 | A1* | 9/2004 | Sauer | B60R 21/2165 280/728.3 |
| 2006/0061140 | A1* | 3/2006 | Schuetz | B29C 44/1214 296/201 |
| 2006/0202446 | A1* | 9/2006 | Chavez | B60R 21/21656 280/728.3 |
| 2007/0278770 | A1* | 12/2007 | Love | B60R 21/215 280/728.3 |
| 2010/0123300 | A1* | 5/2010 | Helmstetter | B60Q 3/283 280/731 |
| 2011/0101653 | A1* | 5/2011 | Rick | B60R 21/21656 29/428 |
| 2011/0109066 | A1* | 5/2011 | Rick | B60R 21/21656 280/728.3 |
| 2011/0116251 | A1* | 5/2011 | Rick | B60Q 3/68 280/731 |
| 2011/0210534 | A1* | 9/2011 | Sauer | B60R 21/215 280/728.2 |

(Continued)

FOREIGN PATENT DOCUMENTS

JP      2005104201 A  *  4/2005  ......... B60R 21/2165

*Primary Examiner* — Barry Gooden, Jr.
(74) *Attorney, Agent, or Firm* — Matthew D. Thayne; Thayne and Davis LLC

(57) ABSTRACT

Airbag covers and related airbag modules designed with weakened portions configured to specifically accommodate emblems. In some embodiments, an airbag cover may comprise an emblem and a tear seam or another weakened portion extending through and/or adjacent to the emblem to create an asymmetrical split such that, following deployment and rupturing of the tear seam, the airbag cover is configured to form first and second airbag cover pieces, wherein a greater number and/or weight of the emblem is on the first airbag cover piece than the second airbag cover piece.

20 Claims, 7 Drawing Sheets

(56) References Cited

U.S. PATENT DOCUMENTS

| | | | |
|---|---|---|---|
| 2013/0277952 A1* | 10/2013 | Jung | B60R 21/215 |
| | | | 280/728.3 |
| 2014/0145419 A1* | 5/2014 | Ishikawa | B60R 21/2165 |
| | | | 280/728.3 |
| 2017/0113644 A1* | 4/2017 | Coon | B60R 21/2165 |
| 2020/0369234 A1* | 11/2020 | Kwon | B60R 21/2165 |
| 2021/0284095 A1* | 9/2021 | Jonietz | B60R 21/21656 |
| 2021/0291776 A1* | 9/2021 | Jonietz | B60R 21/215 |

* cited by examiner

EMBLEMED AIRBAG COVER TEAR SEAMS

SUMMARY

Disclosed herein are various embodiments of airbag covers with emblems having tear seams or other weakened portions, along with related airbag modules. In some embodiments, the tear seams may be designed specifically to accommodate the emblems. For example, in some embodiments, at least a portion of the weakened portion may extend asymmetrically through or about the emblem, such as through an emblem having multiple pieces such that more emblem pieces are on one side of the cover than the other following deployment, or about a periphery of an emblem such that the cover splits to wholly encompass the emblem on one side of the split cover.

In a more particular example of a driver airbag module according to some embodiments, the module may comprise an airbag cover having a plurality of emblem pieces coupled thereto. A tear seam or another weakened portion may extend across the airbag cover and through the plurality of emblem pieces to create an asymmetrical split such that, following deployment and rupturing of the tear seam, the airbag cover is configured to form first and second airbag cover pieces, wherein a greater portion of the plurality of emblem pieces is on the first airbag cover piece than the second airbag cover piece.

In some embodiments, the tear seam may comprise a vertical line extending from an upper region of the airbag cover to a lower region of the airbag cover. In some such embodiments, the tear seam may further comprise an upper horizontal line extending in opposite directions from an upper portion of the vertical line and a lower horizontal line extending in opposite directions from a lower portion of the vertical line to form an I shape. In some such embodiments, the upper horizontal line and the lower horizontal line may be curved to define concavities towards a center of the airbag cover.

In some embodiments, the airbag cover may be configured such that, following deployment and rupturing of the tear seam, a greater weight of the plurality of emblem pieces is on the first airbag cover piece than the second airbag cover piece. Alternatively, the tear seam may be formed such that the surface area of the emblem and/or airbag cover pieces may vary and the weight of the airbag cover pieces may be identical, or at least substantially identical.

In some embodiments, the airbag cover may be configured such that, following deployment and rupturing of the tear seam, a greater number of the plurality of emblem pieces are on the first airbag cover piece than the second airbag cover piece. The plurality of emblem pieces may therefore comprise an odd number of emblem pieces in certain embodiments.

In another example of an airbag assembly according to some embodiments, the assembly may comprise an airbag cover, which may contain an inflatable cushion therein. An emblem may be coupled to the airbag cover, which emblem may comprise a single emblem piece or a plurality of individual emblem pieces. The cover may comprise a weakened portion, such as a tear seam, which may comprise a vertical section extending from an upper region of the airbag cover to a lower region of the airbag cover and immediately adjacent to the emblem to follow at least a portion of a contour of the emblem. The weakened portion may further comprise an upper horizontal section extending between opposing sides of the vertical section along the upper region and a lower horizontal section extending between opposing sides of the vertical section along the lower region. A first hinge may extend between the upper horizontal section and the lower horizontal section on a first lateral side of the airbag cover. Similarly, a second hinge may extend between the upper horizontal section and the lower horizontal section on a second lateral side of the airbag cover opposite the first lateral side. The cover may be configured such that, following deployment and rupturing of the weakened portion, the airbag cover is configured to form first and second airbag cover pieces extending from the first and second hinges.

In some embodiments, the weakened portion extends asymmetrically through the plurality of emblem pieces, such as asymmetrically from a weight perspective, an area perspective, or a number of emblem pieces perspective. In some embodiments, the emblem may comprise an odd number of emblem pieces. In some such embodiments, the weakened portion may extend through the emblem such that an uneven number of emblem pieces are on the first and second airbag cover pieces. In some embodiments, the weakened portion may extend through the emblem such that the first and second airbag cover pieces comprise uneven weights attributable to the emblem.

In some embodiments, the upper horizontal section and the lower horizontal section may comprise curved lines or lines that are otherwise non-straight. For example, in some embodiments, the lines defining the upper horizontal section and the lower horizontal section may define concavities towards a center of the airbag cover.

In some embodiments, the vertical section may comprise a tear seam formed in a line that is at least partially aligned with an indentation associated with at least one emblem piece of the emblem.

In another example of a driver airbag module according to some embodiments, the module may comprise an airbag cover and a plurality of emblem pieces coupled to the airbag cover. The plurality of emblem pieces may comprise an odd number of emblem pieces. A tear seam may extend across the airbag cover and through the plurality of emblem pieces to create an asymmetrical split such that, following deployment and rupturing of the tear seam, the airbag cover is configured to form at least first and second airbag cover pieces. In some embodiments, a greater number of the plurality of emblem pieces may be on the first airbag cover piece than the second airbag cover piece. In some embodiments, the tear seam may define an "I shape," which may comprise a vertical line extending from an upper region of the airbag cover to a lower region of the airbag cover and immediately adjacent to at least one of the plurality of emblem pieces to follow at least a portion of a contour of the at least one of the plurality of emblem pieces; an upper horizontal line extending between opposing sides of the vertical section along the upper region; and a lower horizontal line extending between opposing sides of the vertical section along the lower region. A first hinge may extend between the upper horizontal line and the lower horizontal line on a first lateral side of the airbag cover and a second hinge may extend between the upper horizontal line and the lower horizontal line on a second lateral side of the airbag cover opposite the first lateral side. In some embodiments, following deployment and rupturing of the weakened portion, the airbag cover may be configured to form the first and second airbag cover pieces extending from the first and second hinges.

In some embodiments, the vertical line may be aligned with a portion of an indentation associated with at least one of the plurality of emblem pieces.

Some embodiments may further comprise a third hinge and/or be configured to form a third airbag cover piece. In some such embodiments, additional tear seam sections may be formed, such as lines extending from the upper horizontal section, to form the third airbag cover piece.

In some embodiments, the upper horizontal line and the lower horizontal line may be curved to define concavities towards a center of the airbag cover.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1A:
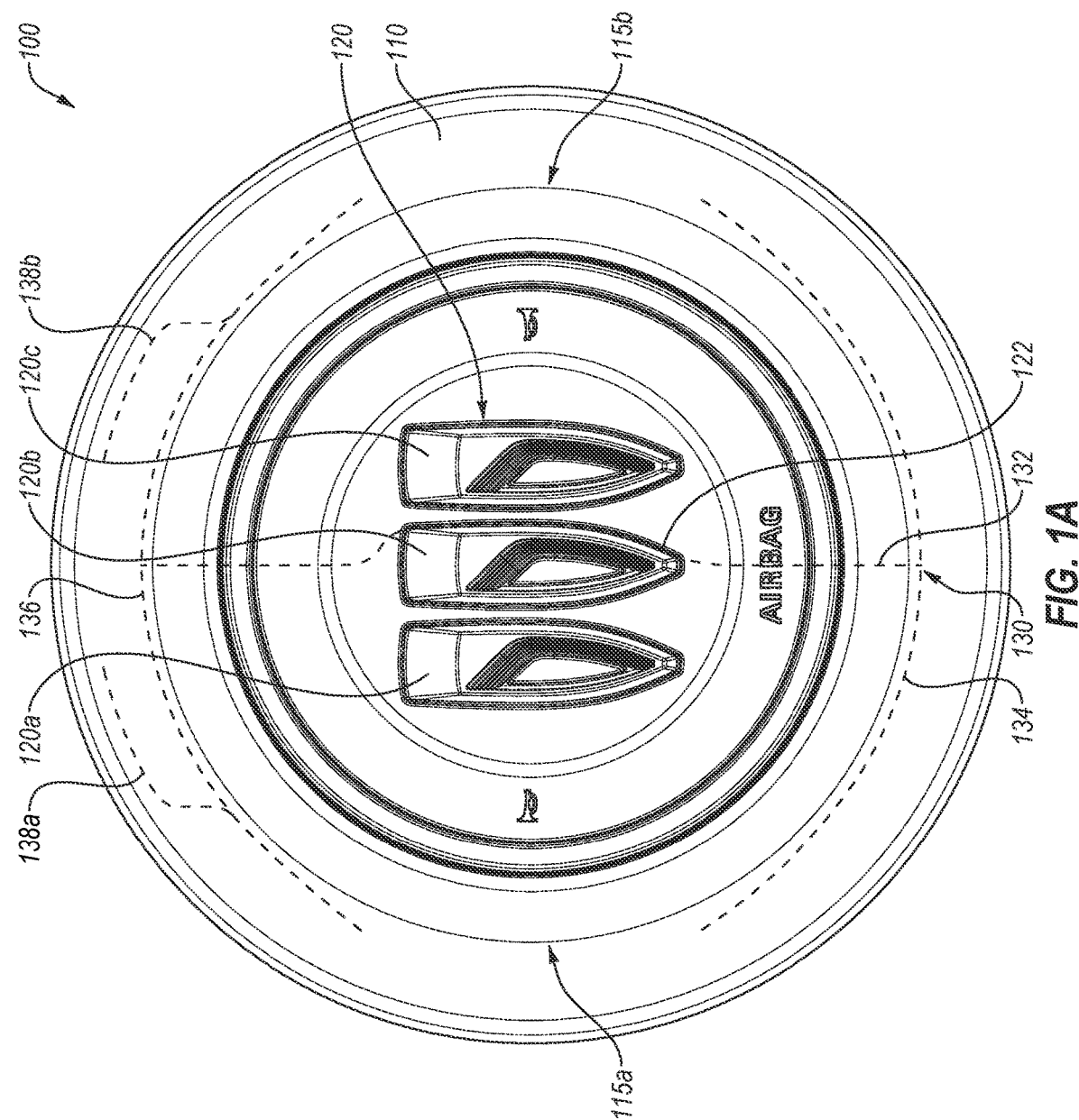
FIG. 1A is an upper plan view of a driver airbag module according to some embodiments.

FIG. 1A depicts a driver airbag module 100 according to some embodiments. Airbag module 100 comprises an airbag cover 110 having an airbag cushion (not shown) contained therein. Airbag cover 110 comprises an emblem 120 comprising a plurality of emblem pieces 120*a*, 120*b*, and 120*c*. Upon deployment of the airbag cushion contained therein, cover 110 is configured to open by pivoting opposing hinge portions 115*a* and 115*b*. Hinge portions 115*a* and 115*b* are defined, at least in part, by weakened portions that, in preferred embodiments, comprise a tear seam 130.

Tear seam 130 facilitates opening of airbag cover 110 in desired locations, resulting in a desired deployment of the airbag, and includes a vertical section 132 extending from an upper region of the airbag cover 110 to a lower region of the airbag cover 110. Vertical section 132 is also formed to follow and extend immediately adjacent to at least a portion of emblem 120. In preferred embodiments, tear seam 130 follows at least a portion of a contour 122 of the emblem 120, as shown in FIG. 1A.

As also shown in FIG. 1A, vertical section 132 of tear seam 130 extends straight above and below emblem 120, but projects away from this straight line to extend around a contour of emblem piece 120*b* of emblem 120 on one side. This may be useful for several reasons. For example, extending a tear seam along a groove or indentation that already exists in cover 110, such as may be the case for the contour of emblem piece 120*b* along which tear seam section 132 runs, may allow for hiding of read through caused by the tear seam.

It can also be seen in FIG. 1A that tear seam section 132 extends asymmetrically through the plurality of emblem pieces 120*a*/120*b*/120*c* that collectively define emblem 120. More particularly, tear seam section 132 extends through emblem 120 such that two emblem pieces, namely, emblem pieces 120*a* and 120*b*, will be associated with one piece or "flap" of airbag cover 110 following deployment and the other emblem piece 120*c* will be associated with the other/opposite piece/flap of airbag cover 110. This may also have benefits for certain applications.

For example, it may be preferred to have one side of the cover open slightly before the other so as to provide clearance for the second side to avoid interference between the two during deployment. However, in some embodiments, it may be preferred to equalize, or at least substantially equalize, the weight between the two (or more) sections defined by tear seams or other weakened portions while still extending at least a portion of the tear seam asymmetrically through an emblem. This may be accomplished, for example, by adding weight to an emblem on a side having fewer emblem pieces or otherwise adding weight to this side of the airbag cover. Alternatively, the tear seam may be formed in a manner that equalizes, or at least substantially equalizes, the weight on each side/portion of the cover by, for example, extending the tear seam that splits an emblem asymmetrically in a manner that causes the section/portion having a smaller number/portion of the emblem to have a greater portion of the surface area, in some cases in a manner that equalizes or at least reduces the weight discrepancy between the sides/portions.

As also shown in FIG. 1A, tear seam 130 further comprises a lower horizontal section 134 extending in opposite directions from the lower end of vertical section 132 and an upper horizontal section 136 extending in opposite directions from the upper end of vertical section 132. Collectively, tear seam 130 therefore defines an "I" shape, notwithstanding the fact that the upper horizontal section 136 and the lower horizontal section 134 comprise lines that are curved to form concavities towards a center of the airbag cover 110.

Upper horizontal section 136 of tear seam 130 further comprises opposing sections 138a and 138b that extend from a central region between vertical tear seam 132 and the terminal end of horizontal section 136 on opposite sides of cover 110. Sections 138a and 138b initially extend in an upper diagonal direction towards the top of the cover 110 and then form straight lines adjacent to an upper edge of cover 110 towards one another.

Sections 138a and 138b may be configured to facilitate relieve undesirable cushion interaction with an occupant in OOP conditions, such as an FMVSS 208 condition. These sections may allow the emerging cushion (if partially blocked by the occupant) to find a relief path towards the twelve o'clock position to go behind the steering wheel rim and limit some of the forces exerted onto the occupant.

Sections 138a and 138b may also be useful in some embodiments for relieving the "oil can" effect that is more prevalent on round/circular driver airbag designs in which, during deployment, the cover opens and distributes the opening effect around the circumference of the opening in an outward fashion. Sections 138a and 138b may be used to provide relief from the circumference for the cover to flex instead of stretching.

Although sections 138a and 138b are shown formed in the shape of a letter "J" and this shape may be most useful in connection with covers having significant curvature at the twelve o'clock position. However, it is contemplated that other embodiments in which the cover is more flat may comprise straight tear paths without the need for the hook portion of the J-shape best illustrated in FIG. 2A. In addition, in some embodiments, the width of the bridge may be adjusted, the width and/or depth of a door in the cover may be adjusted, and/or tear seam stops and/or ribs may be provided.

Figure 1B:
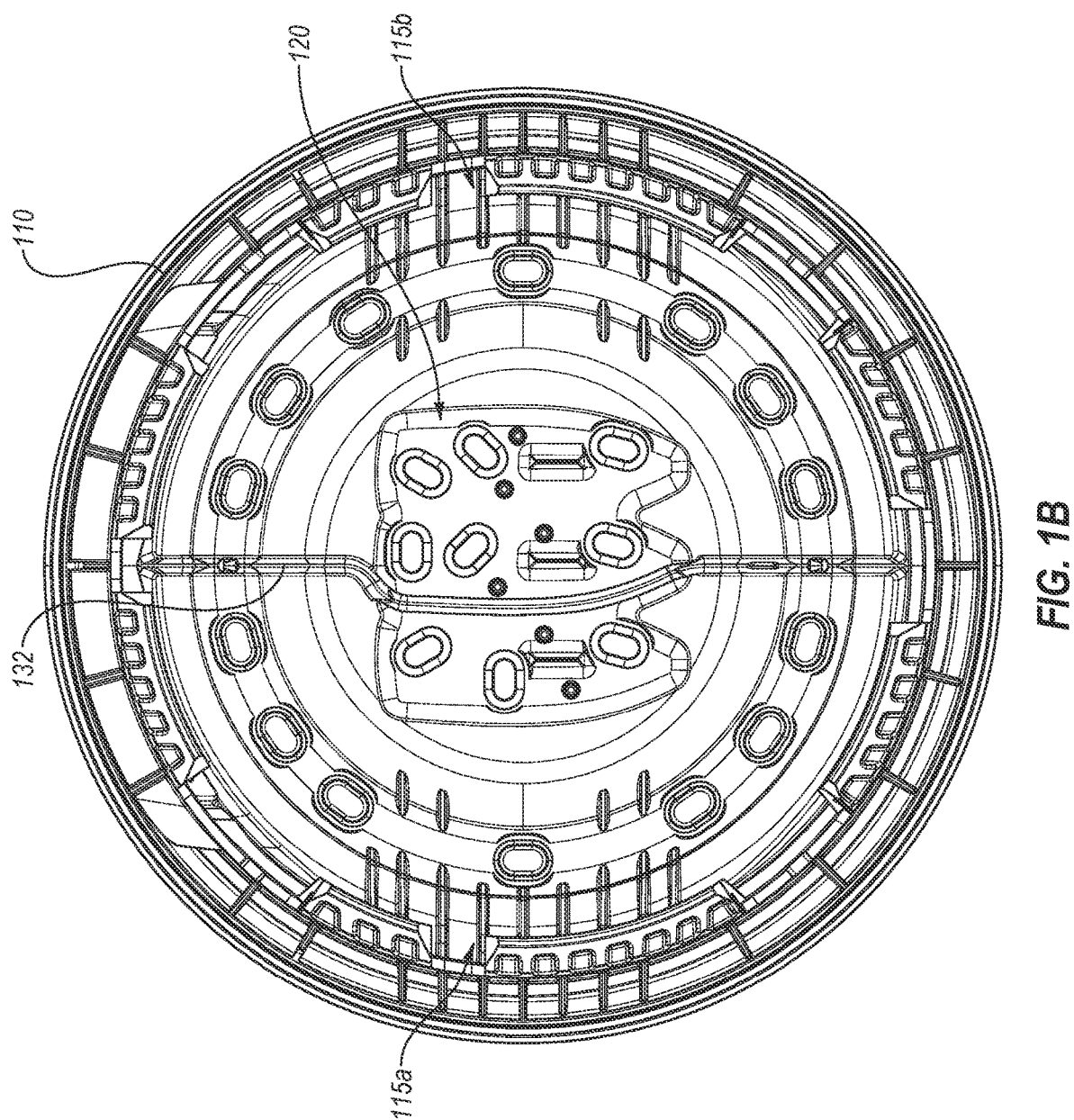
FIG. 1B is a lower plan view of the driver airbag module of FIG. 1A.

FIG. 1B shows the inner surface of cover 110. The vertical section 132 of tear seam 130 is shown extending through emblem 120. Although the individual emblem pieces are not as distinct in this view, it can be seen that the tear seam 130 extends into emblem 120 in an asymmetric manner.

Figure 2A:
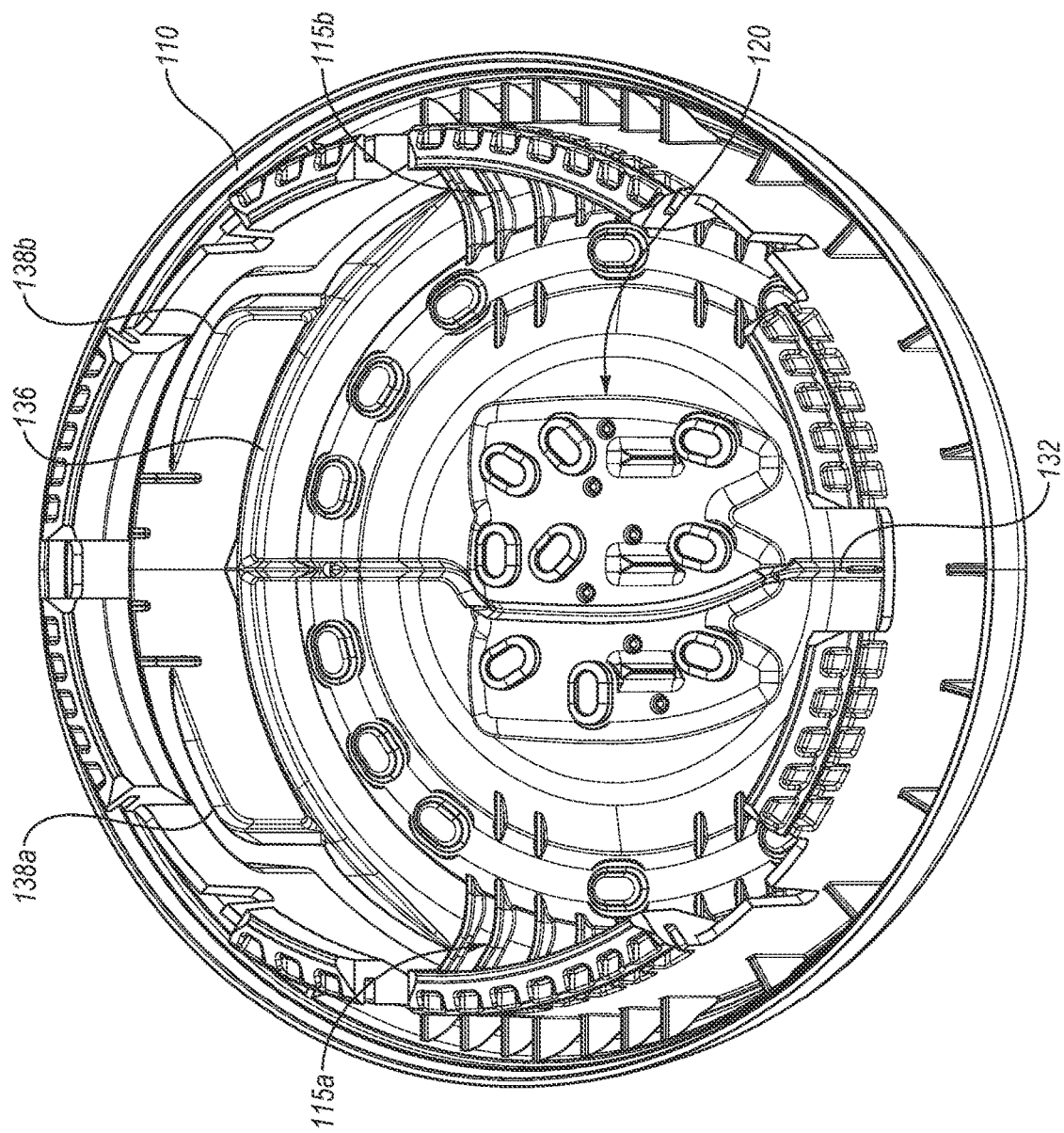
FIG. 2A is a first perspective view of the driver airbag module showing the center and upper portions of the tear seam.
Figure 2B:
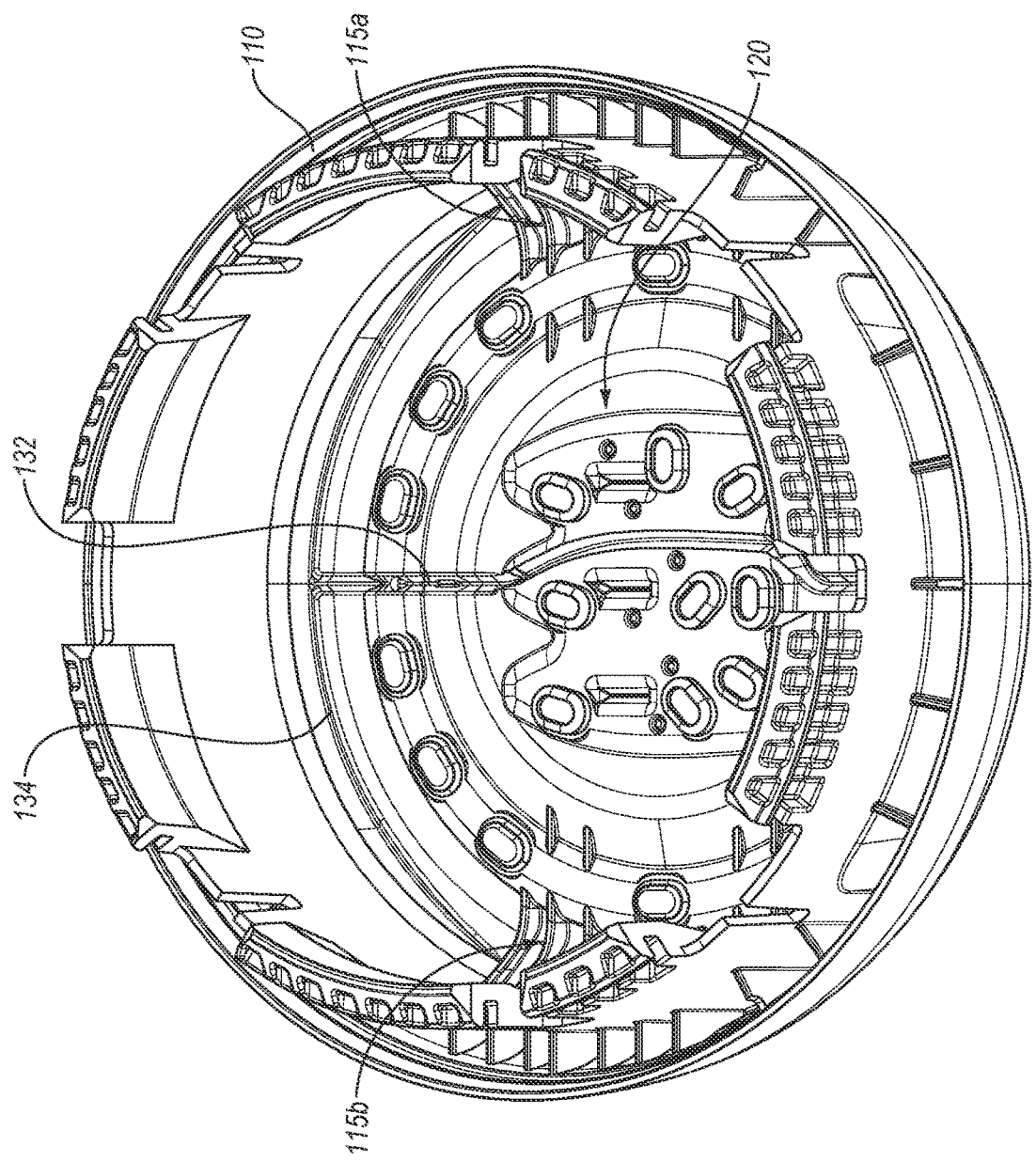
FIG. 2B is a second perspective view of the driver airbag module showing the center and lower portions of the tear seam.

FIGS. 2A and 2B are tilted perspective views that show, respectively, the upper and lower portions of tear seam 130. FIG. 2A further illustrates that portions 138a and 138b of tear seam 130 extend up the sidewall of cover 110 rather than along the relatively flat portion of cover 110 defining the exterior surface of a central portion of a steering wheel. This may allow a top portion of cover 110 to pivot away during deployment as well, as shown and described in connection with FIG. 4 below.

Figure 3:
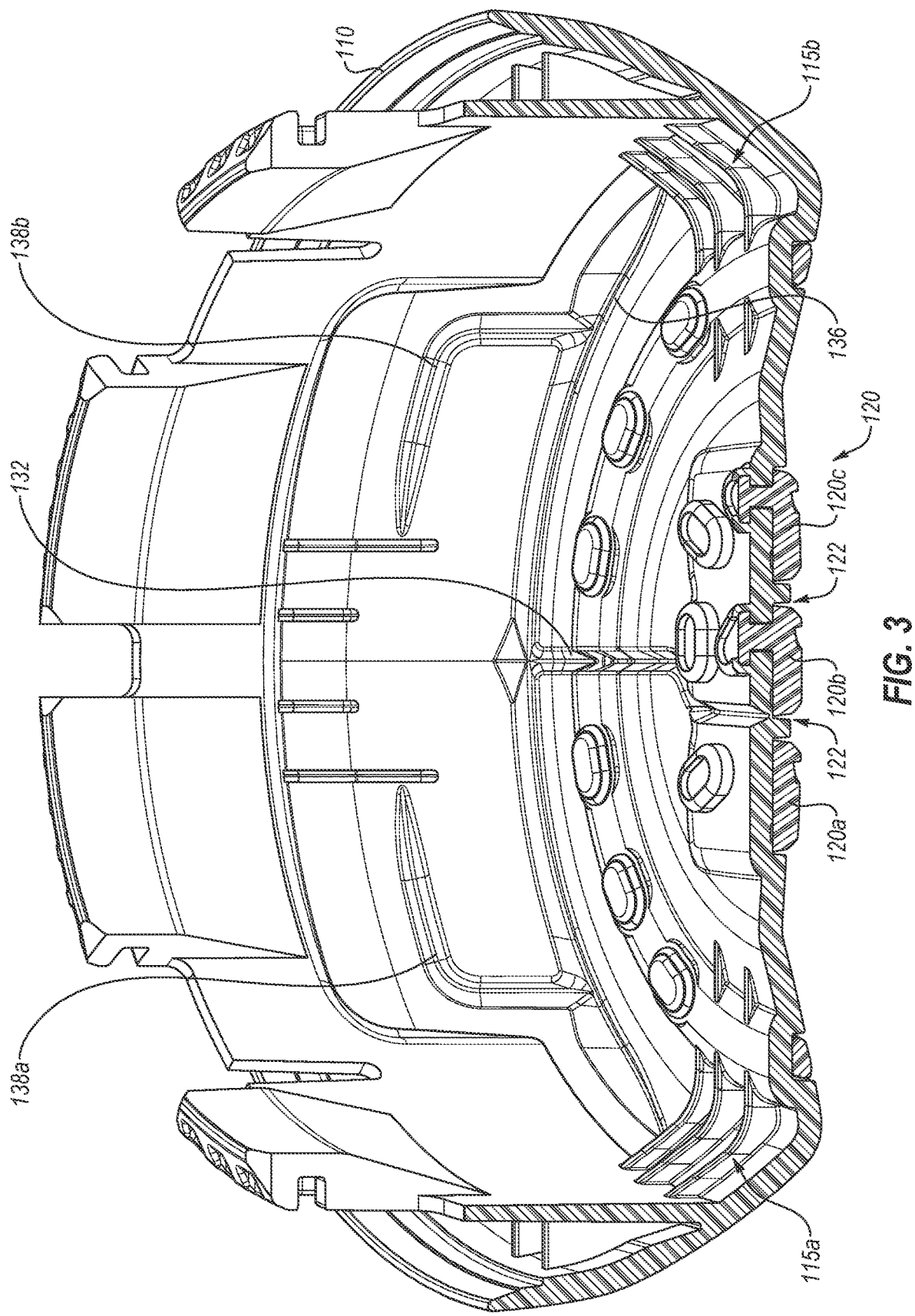
FIG. 3 is a cross-sectional view of the driver airbag module taken through the emblem.

The cross-sectional view of FIG. 3 better illustrates the alignment of a portion of contour 122 of the emblem 120 and a portion of tear seam 130, namely, vertical portion 132 of contour 130 in preferred embodiments. As shown in this figure, contour 130 may be created by an edge of an emblem piece 120b. FIG. 3 further illustrates the shape of tear seam 130. As shown in the figure, in preferred embodiments, tear seam 130 may comprise a seam in the shape of a "V", which may define an angle, for example, between about 30 degrees and about 60 degrees in some embodiments. In some embodiments, tear seam 130 may comprise a thickness (defined from the bottom of the V to the nearest class-A outer exposed surface through which the cover material will need to tear in order to open the cover) of between about 0.4 and about 0.8 mm.

Figure 4:
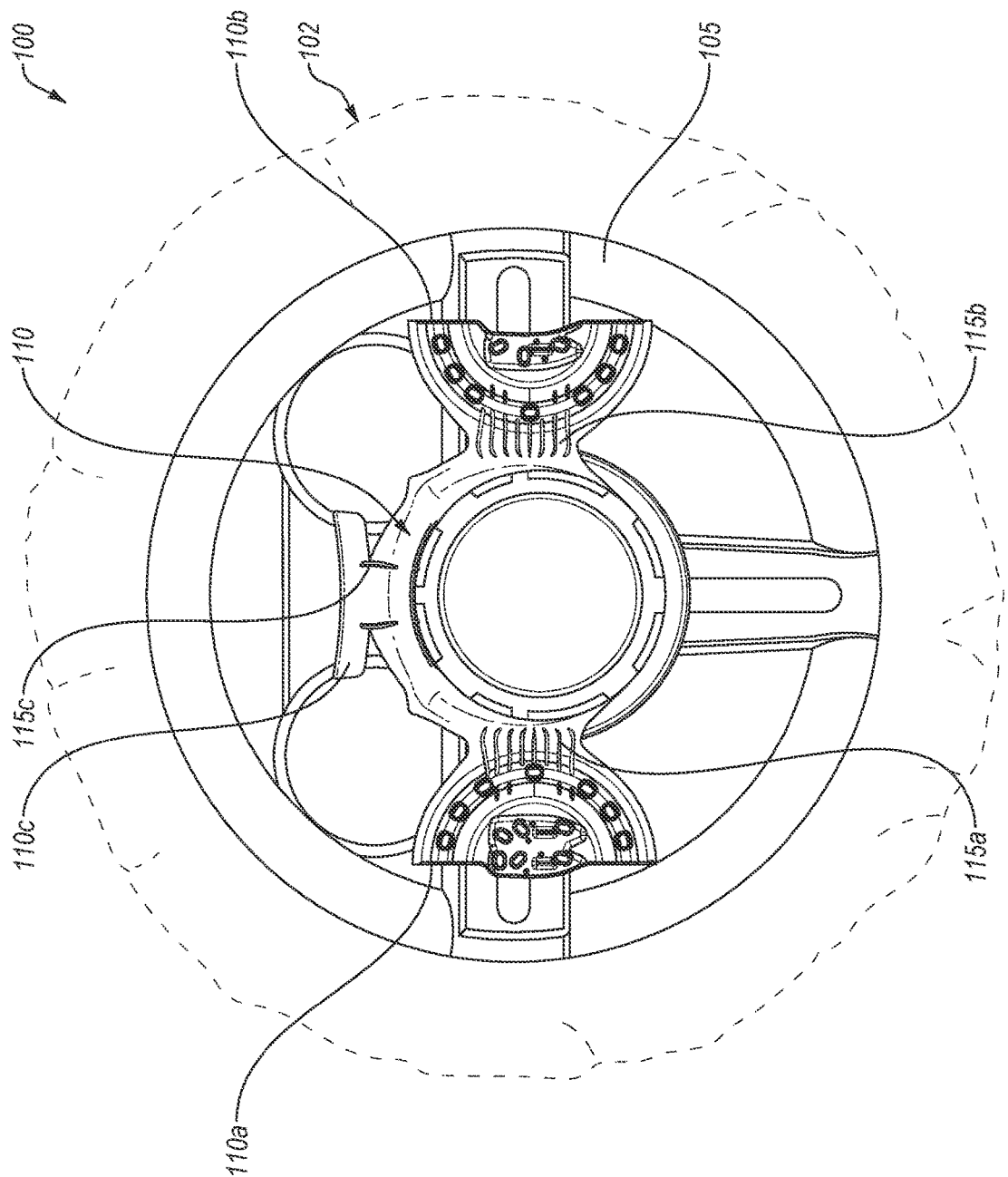
FIG. 4 depicts a steering wheel of a vehicle with the driver airbag module following deployment.

FIG. 4 illustrates airbag module 100 following deployment from a steering wheel 105. An airbag cushion 102 is shown in phantom after it has been deployed from cover 110. As illustrated, deployment and rupturing of the weakened portions of cover 110 has formed first and second airbag cover pieces 110a and 110b from the first and second hinges 115a and 115b, respectively. Although these are the primary pieces formed following deployment, there is also an upper piece 110c that extends from an upper hinge 115c and is formed, at least in part, by sections 138a and 138b of tear seam 130.

Figure 5:
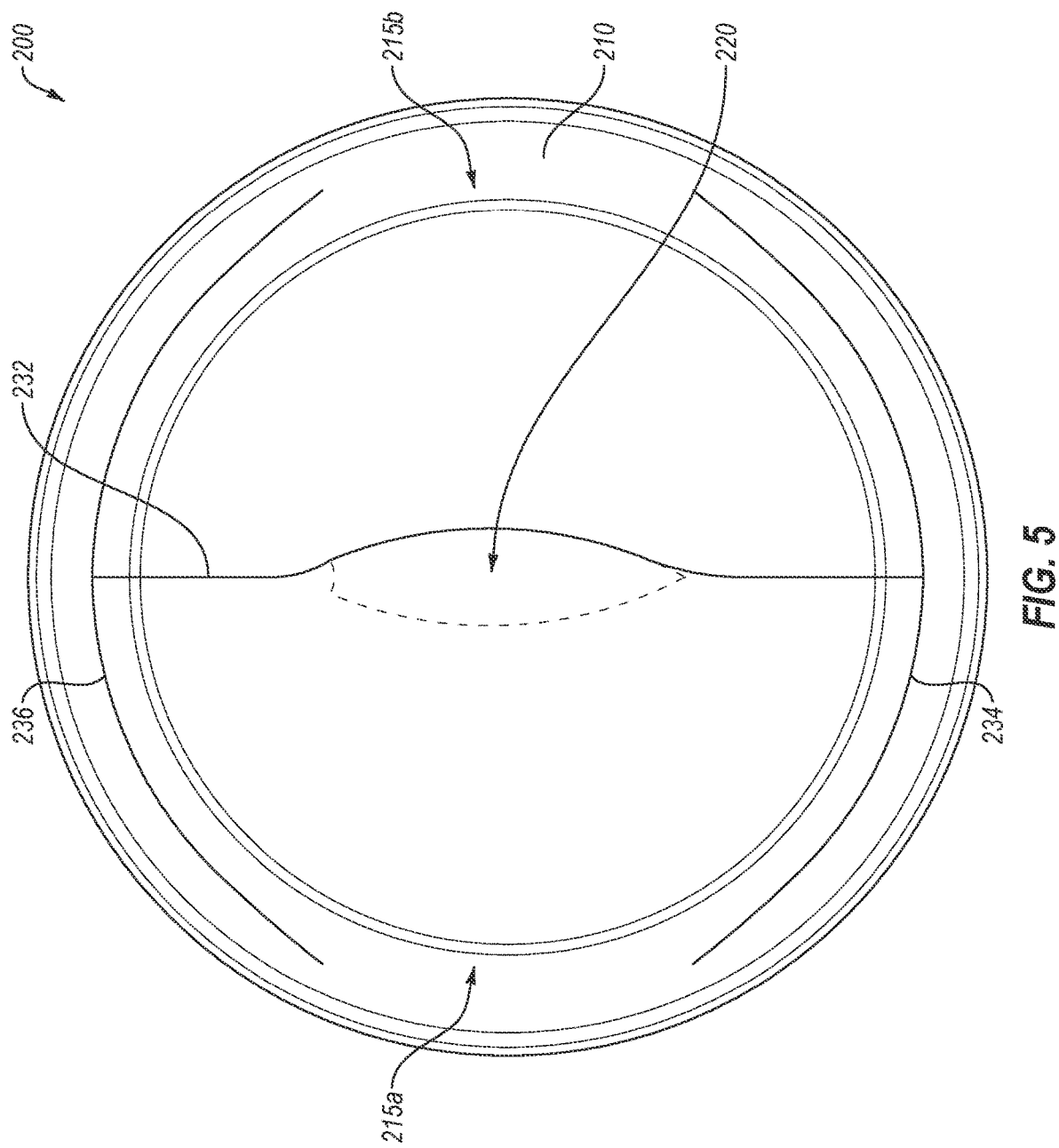
FIG. 5 is a top plan view of a driver airbag module according to another embodiment.

An alternative embodiment of an airbag module 200 is depicted in FIG. 5. Airbag module 200 comprises a cover 210 that again comprises an emblem 220. However, unlike emblem 120 of cover 110, cover 210 comprises only a single emblem piece. Upon deployment of the airbag cushion contained therein, cover 210 is configured to open by pivoting opposing hinge portions 215a and 215b. Hinge portions 215a and 215b are defined, at least in part, by weakened portions that, in preferred embodiments, comprise a tear seam.

The tear seam of FIG. 5 includes a vertical section 232 extending from an upper region of the airbag cover 210 to a lower region of the airbag cover 210. Vertical section 232 is also formed to follow and extend immediately adjacent to at least a portion of emblem 220. In the depicted embodiment, tear seam 230 follows at least a portion of a contour of the emblem 220, as shown in FIG. 5.

As also shown in FIG. 5, vertical section 232 of tear seam 230 extends straight above and below emblem 220, but projects away from this straight line to extend around a contour of emblem 220 on one side. Thus, tear seam section 232 extends asymmetrically along the single emblem piece defining emblem 220.

Like the tear seam of cover 110, the tear seam of cover 210 further comprises a lower horizontal section 234 extending in opposite directions from the lower end of vertical section 232 and an upper horizontal section 236 extending in opposite directions from the upper end of vertical section 232. Collectively, tear seam 230 therefore defines an "I" shape, notwithstanding the fact that the upper horizontal section 236 and the lower horizontal section 234 comprise lines that are curved to form concavities towards a center of the airbag cover 210.

It should also be understood that, whereas the depicted embodiments having multiple emblem pieces are made up of emblem pieces having a tear seam extending along a border between adjacent pieces, various alternative embodiments are contemplated. For example, in some embodiments, multiple emblem pieces may be positioned stacked on one another with a tear seam extending thereunder, with or without being configured to break through the emblem upon deployment. As another example, in some embodiments, multiple emblem pieces may be pre-assembled and then inserted into the cover with the tear seam under the emblem, in some such embodiments so as to allow for an uneven split between the emblem pieces following deployment.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A driver airbag module, comprising:
    an airbag cover;
    an emblem comprising a plurality of emblem pieces coupled to the airbag cover; and
    a tear seam extending across the airbag cover and through the emblem without extending through any individual emblem pieces of the plurality of emblem pieces to create an asymmetrical split such that, following deployment and rupturing of the tear seam, the airbag cover is configured to form first and second airbag cover pieces, wherein a greater portion of the plurality of emblem pieces is on the first airbag cover piece than the second airbag cover piece.

2. The driver airbag module of claim 1, wherein the tear seam comprises a vertical line extending from an upper region of the airbag cover to a lower region of the airbag cover.

3. The driver airbag module of claim 2, wherein the tear seam further comprises an upper horizontal line extending in opposite directions from an upper portion of the vertical line and a lower horizontal line extending in opposite directions from a lower portion of the vertical line to form an I shape.

4. The driver airbag module of claim 3, wherein the upper horizontal line and the lower horizontal line are curved to define concavities towards a center of the airbag cover.

5. The driver airbag module of claim 1, wherein the airbag cover is configured such that, following deployment and rupturing of the tear seam, a greater weight of the plurality of emblem pieces is on the first airbag cover piece than the second airbag cover piece.

6. The driver airbag module of claim 1, wherein the airbag cover is configured such that, following deployment and rupturing of the tear seam, a greater number of the plurality of emblem pieces are on the first airbag cover piece than the second airbag cover piece.

7. The driver airbag module of claim 6, wherein the plurality of emblem pieces comprises an odd number of emblem pieces.

8. An airbag assembly, comprising:
    an airbag cover;
    an emblem coupled to the airbag cover, wherein the emblem is centered about a peripheral border;
    a weakened portion, comprising:
        a vertical section extending from an upper region of the airbag cover to a lower region of the airbag cover and immediately adjacent to the emblem to follow at least a portion of a contour of the emblem and to extend through the emblem so as to split the emblem into two asymmetrical portions following severance of the weakened portion;
        an upper horizontal section extending between opposing sides of the vertical section along the upper region; and
        a lower horizontal section extending between opposing sides of the vertical section along the lower region;
    a first hinge extending between the upper horizontal section and the lower horizontal section on a first lateral side of the airbag cover; and
    a second hinge extending between the upper horizontal section and the lower horizontal section on a second lateral side of the airbag cover opposite the first lateral side, wherein, following deployment and rupturing of the weakened portion, the airbag cover is configured to form first and second airbag cover pieces extending from the first and second hinges.

9. The airbag assembly of claim 8, wherein the emblem comprises a plurality of emblem pieces.

10. The airbag assembly of claim 9, wherein the weakened portion extends asymmetrically through the plurality of emblem pieces.

11. The airbag assembly of claim 10, wherein the emblem comprises an odd number of emblem pieces, and wherein the weakened portion extends between the plurality of emblem pieces such that an uneven number of emblem pieces are on the first and second airbag cover pieces.

12. The airbag assembly of claim 9, wherein the weakened portion extends through the emblem such that the first and second airbag cover pieces comprise uneven weights attributable to the emblem.

13. The airbag assembly of claim 12, wherein the emblem comprises an even number of emblem pieces.

14. The airbag assembly of claim 8, wherein the weakened portion comprises a tear seam.

15. The airbag assembly of claim 14, wherein the upper horizontal section and the lower horizontal section comprise lines that are curved.

16. The airbag assembly of claim 15, wherein the lines defining the upper horizontal section and the lower horizontal section define concavities towards a center of the airbag cover.

17. The airbag assembly of claim 14, wherein the vertical section comprises a tear seam formed in a line that is at least partially aligned with an indentation associated with at least one emblem piece of the emblem.

18. A driver airbag module, comprising:
- an airbag cover;
- a decorative emblem comprising a plurality of emblem pieces coupled to the airbag cover, wherein the plurality of emblem pieces comprises an odd number of emblem pieces; and
- a tear seam extending across the airbag cover and through the plurality of emblem pieces without extending through any individual emblem pieces of the plurality of emblem pieces to create an asymmetrical split such that, following deployment and rupturing of the tear seam, the airbag cover is configured to form first and second airbag cover pieces, wherein a greater number of the plurality of emblem pieces is on the first airbag cover piece than the second airbag cover piece, and wherein the tear seam defines an "I shape" comprising:
    - a vertical line extending from an upper region of the airbag cover to a lower region of the airbag cover and immediately adjacent to at least one of the plurality of emblem pieces to follow at least a portion of a contour of the at least one of the plurality of emblem pieces;
    - an upper horizontal line extending between opposing sides of the vertical section along the upper region; and
    - a lower horizontal line extending between opposing sides of the vertical section along the lower region;
- a first hinge extending between the upper horizontal line and the lower horizontal line on a first lateral side of the airbag cover; and
- a second hinge extending between the upper horizontal line and the lower horizontal line on a second lateral side of the airbag cover opposite the first lateral side, wherein, following deployment and rupturing of the weakened portion, the airbag cover is configured to form the first and second airbag cover pieces extending from the first and second hinges.

19. The driver airbag module of claim 18, wherein the upper horizontal line and the lower horizontal line are curved to define concavities towards a center of the airbag cover.

20. The driver airbag module of claim 18, wherein the vertical line is at least partially aligned with an indentation associated with at least one of the plurality of emblem pieces.

\* \* \* \* \*